United States Patent
Gadzella et al.

(10) Patent No.: US 10,561,057 B2
(45) Date of Patent: Feb. 18, 2020

(54) ADJUSTABLE CLAMP ON HEAD BRACKET

(71) Applicant: CNH Industrial Canada, Ltd., Saskatoon (CA)

(72) Inventors: Gerard James Gadzella, Saskatton (CA); Marvin A. Prickel, Homer Glen, IL (US); Michael J. Connors, Lockport, IL (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/988,571

(22) Filed: May 24, 2018

(65) Prior Publication Data
US 2018/0263179 A1    Sep. 20, 2018

Related U.S. Application Data

(60) Continuation of application No. 15/657,906, filed on Jul. 24, 2017, now Pat. No. 10,334,774, which is a division of application No. 14/755,034, filed on Jun. 30, 2015, now Pat. No. 9,743,576.

(51) Int. Cl.
*A01B 15/14*    (2006.01)
*A01C 7/20*    (2006.01)

(52) U.S. Cl.
CPC .............. *A01C 7/201* (2013.01); *A01B 15/14* (2013.01); *H05K 999/00* (2013.01)

(58) Field of Classification Search
CPC ........ A01B 15/14; A01B 59/002; A01C 7/201
USPC .................. 172/695, 697, 763; 248/637, 674
See application file for complete search history.

(56) References Cited

U.S. PATENT DOCUMENTS

| | | | |
|---|---|---|---|
| 2,637,262 A | | 5/1953 | Altgelt |
| 2,737,004 A | | 3/1956 | Archer |
| 2,743,657 A | | 5/1956 | Kriegbaum |
| 2,897,614 A | | 8/1959 | Billings |
| 3,387,667 A | | 6/1968 | Rice |
| 3,578,089 A | | 5/1971 | Fischer |
| 3,756,327 A | | 9/1973 | Orthman |
| 4,146,074 A | * | 3/1979 | Kowalski .............. F16B 37/046 411/111 |
| 4,241,674 A | | 12/1980 | Mellinger |
| 4,251,014 A | | 2/1981 | Salley et al. |
| 4,263,952 A | * | 4/1981 | Kowalski .............. F16B 37/046 411/112 |
| 4,452,320 A | | 6/1984 | Meiners |
| 4,494,883 A | | 1/1985 | Winter |
| 5,555,824 A | | 9/1996 | Stufflebeam et al. |

(Continued)

*Primary Examiner* — Gary S Hartmann
(74) *Attorney, Agent, or Firm* — Rebecca L. Henkel; Rickard K. DeMille

(57) ABSTRACT

A fastening arrangement attaches a row unit to the tool bar of an agricultural implement. The fastening arrangement includes an elongated flat operatively connected to the tool bar. The elongated flat has a leading surface lying in a first plane nonadjacent to a second plane which includes a trailing surface of the tool bar. A head bracket is adapted to receive a row unit. The head bracket has an aperture therethough and is supportable on the elongated flat. A clamping nut and bolt combination is configured to fasten the head bracket to the elongated flat. The clamping nut and bolt combination includes a bolt adapted to pass through the aperture of the head bracket and engage the clamping nut in a mating relationship.

18 Claims, 7 Drawing Sheets

(56) References Cited

U.S. PATENT DOCUMENTS

| | | | |
|---|---|---|---|
| 5,628,598 A * | 5/1997 | Hofle | F16B 37/045 |
| | | | 411/104 |
| 5,743,338 A | 4/1998 | Gomez et al. | |
| 5,743,341 A | 4/1998 | Wattonville | |
| 5,974,986 A | 11/1999 | Trisler | |
| 6,240,860 B1 | 6/2001 | Forchino | |
| 6,672,018 B2 * | 1/2004 | Shingleton | F24S 25/636 |
| | | | 52/173.3 |
| 7,197,993 B2 | 4/2007 | Chellemi et al. | |
| 7,540,333 B2 | 6/2009 | Bettin | |
| 8,763,978 B2 * | 7/2014 | Newman | H02S 20/10 |
| | | | 248/500 |
| 9,271,438 B2 | 3/2016 | Reade | |
| 9,281,428 B2 * | 3/2016 | Newman | H02S 20/23 |
| 9,743,576 B2 * | 8/2017 | Gadzella | A01C 7/201 |
| 9,848,526 B2 * | 12/2017 | Gadzella | A01C 7/201 |
| 9,955,626 B2 | 5/2018 | Bruer et al. | |
| 2014/0209335 A1 | 7/2014 | Casper et al. | |
| 2017/0000004 A1 | 1/2017 | Gadzella et al. | |
| 2017/0318739 A1 * | 11/2017 | Gadzella | A01C 7/201 |

* cited by examiner

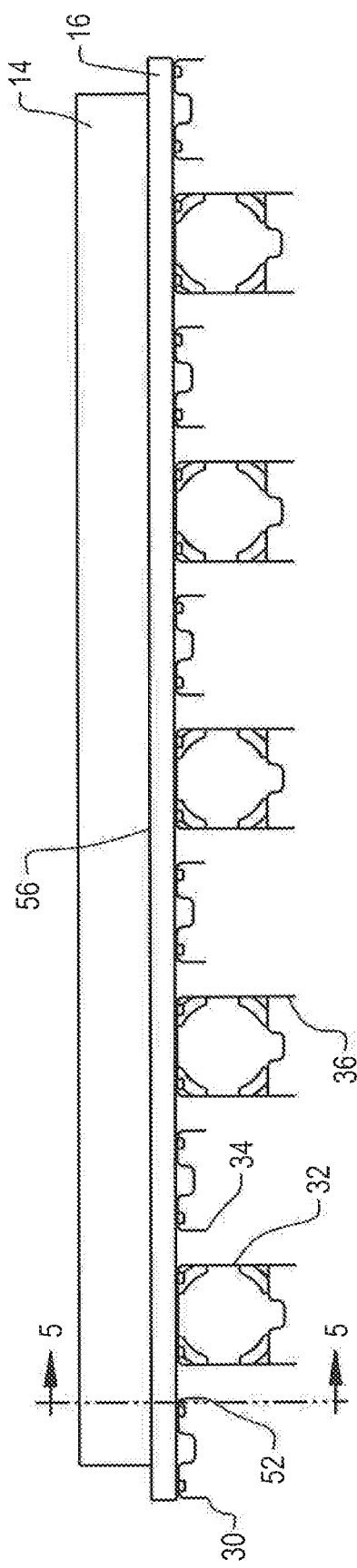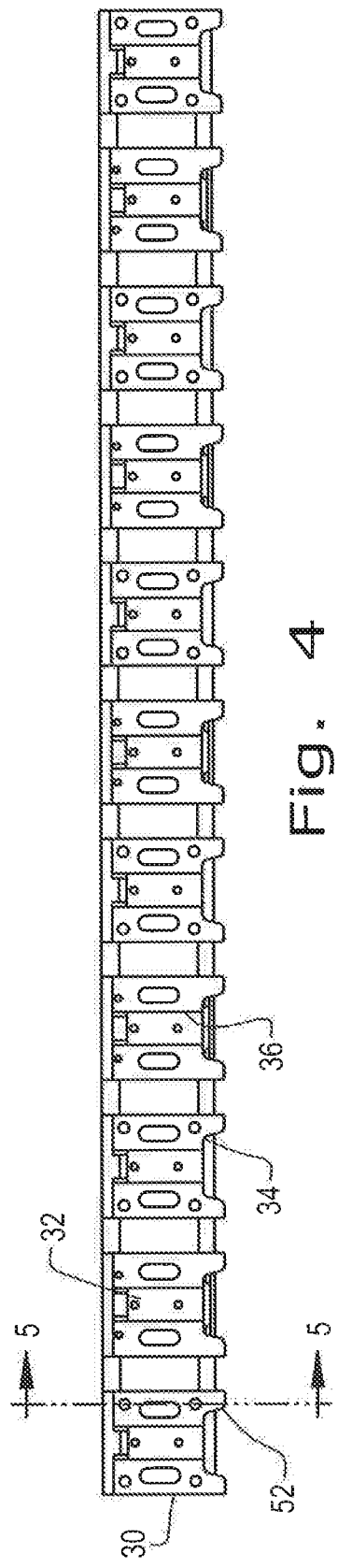

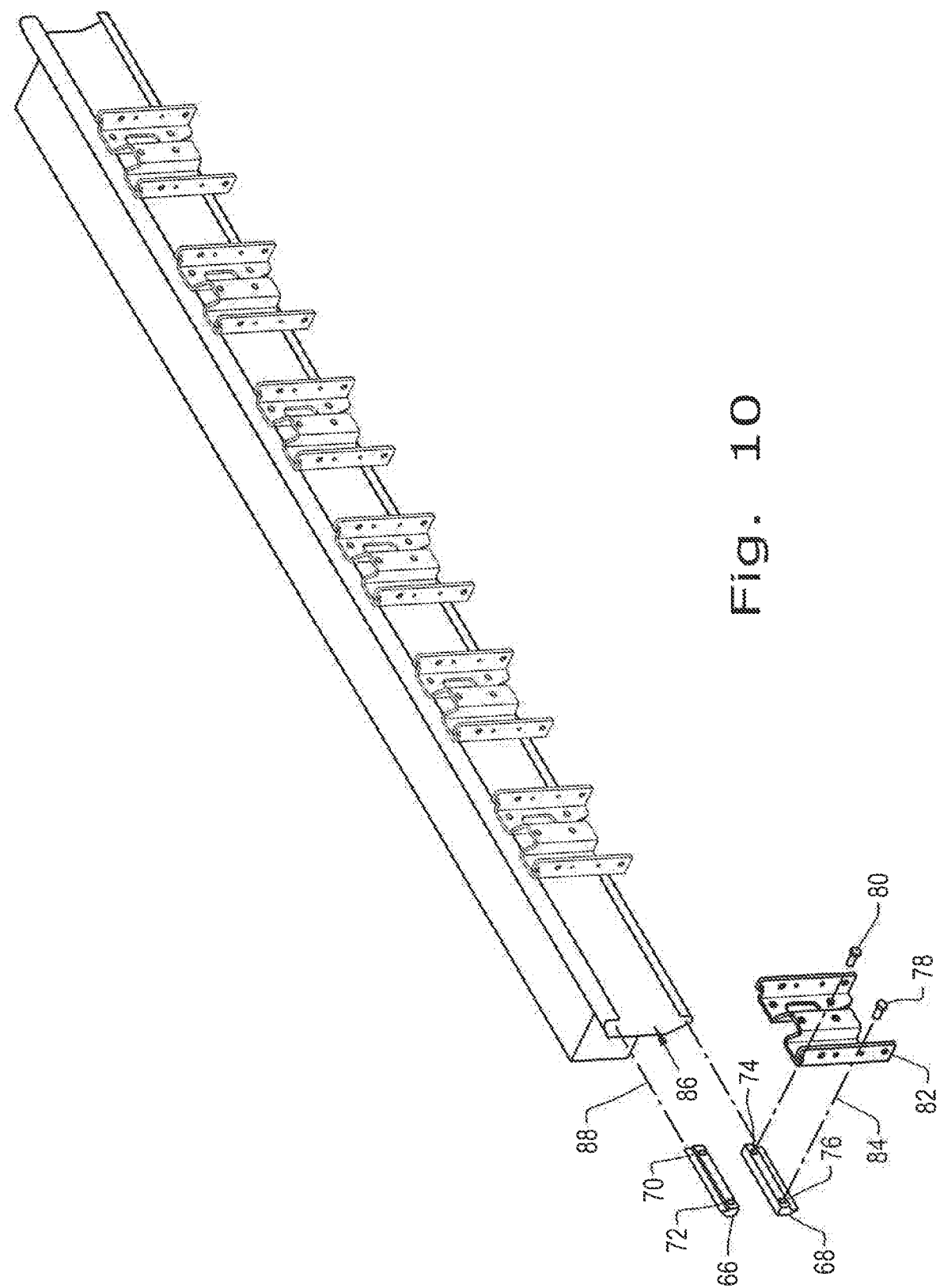

ADJUSTABLE CLAMP ON HEAD BRACKET

CROSS-REFERENCE TO RELATED APPLICATION

This application is a Continuation of U.S. Ser. No. 15/657,906 filed Jul. 24, 2017, which is a divisional of U.S. Ser. No. 14/755,034, filed Jun. 30, 2015, now U.S. Pat. No. 9,743,576, issued Aug. 29, 2017.

BACKGROUND OF THE INVENTION

1. Field of the Invention

The present invention relates to ground working equipment, such as an agricultural implement, and, more particularly, to a system for attaching row units on an agricultural implement.

2. Description of the Related Art

Generally, planting implements (e.g., planters) are towed behind a tractor or other work vehicle via a mounting bracket secured to a rigid frame (tool bar) of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool that forms a seeding path for seed deposition into the soil. As the implement travels across a field, the opener excavates a trench into the soil, and seeds are deposited into the trench. Individual row units are usually attached to a common implement tool bar, for example by U-bolts which fasten row unit receiving head brackets to the tool bar.

Some planters, known as splitters, have the ability to plant two different crops. For example, corn is typically planted in rows spaced 30 inches on center from one another while beans are more closely spaced at 15 inches between rows. A planter having 31 row units may have adjacent row units longitudinally offset from one another to allow field debris to pass around the offset units. Alternate ones of the units, 15 in this example, may be pivoted out of the way for planting, e.g., corn, in more widely spaced rows while the those units may be pivoted down and employed in planting crop such as beans in 31 more narrowly spaced rows.

Some farmers purchase a planter and modify it to change spacing. They may buy a 24 row planter with 20 inch spacing and change it to 12 row with 38 inch spacing to plant specialty crops. Tool bars are becoming increasingly crowded. Today with all of the obstructions on top of the bar (vacuum systems, hydraulic systems, and other structures) modifying the planter configuration is difficult.

What is needed in the art is a simple technique for modifying a planter configuration.

SUMMARY OF THE INVENTION

The present invention provides a way to attach head brackets to a tool bar using a clamping system for easier adjusting to the spacing of row units.

The invention in one form is directed to a towable agricultural implement having a transverse tool bar, a plurality of like row units, and a coupling arrangement for coupling the row units to the tool bar. A plurality of like brackets each receive a corresponding row unit head and an elongated transverse member of generally uniform C-shaped cross-sectional configuration has the closed side of the "C" fixed to the tool bar. Each of the brackets is bolted to the open side of the "C" opposite the tool bar.

The invention in another form is directed to a fastening arrangement for attaching row units to the tool bar of an agricultural implement. A plurality of head brackets are each adapted to receive a row unit. An elongated open C-shaped channel member is connected to the tool bar and protruding therefrom to removable receive a plurality of row unit head brackets. A plurality of clamping nut and bolt assemblies fasten the head brackets to the channel member. Each clamping nut and bolt assembly includes a bolt adapted to pass through a head bracket aperture and threadedly engage the corresponding clamping nut. Each clamping nut grips the inner edge of the "C" as a bolt is tightened.

In yet another form, the invention, there is a clamping nut and bolt assembly for fastening a head bracket of an agricultural implement to an elongated open C-shaped channel member. The clamping nut is formed as an elongated rigid member having a transverse threaded aperture and an elongated lip extending along one edge generally orthogonal to the threaded aperture. The lip is contoured to mate with a corresponding edge of the open side of the "C". The clamping nut may include a second transverse threaded aperture extending generally parallel to and spaced from the first threaded aperture whereby the clamping nut may accommodate a pair of bolts.

An advantage of the present invention is that if is now possible to provide a common tool bar (or tooling) for different sized planters.

Another advantage is some tool bar clutter is alleviated and the repositioning of row unit head brackets is facilitated.

Yet another advantage is the possibility of providing a blank tool bar and the appropriate row unit completing kits to allow farmers to custom build a planter.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a top plan view of the tool bar, C-shaped channel and head brackets of FIG. 2;

FIG. 4 is a rear elevation view of the structure of FIGS. 2 and 3;

FIG. 10 is an exploded isometric view of the variation of FIGS. 7-9.

Corresponding reference characters indicate corresponding parts throughout the several views. The exemplification set out herein illustrates one embodiments of the invention, in one form, and such exemplification is not to be construed as limiting the scope of the invention in any manner.

DETAILED DESCRIPTION OF THE INVENTION

Figure 1:
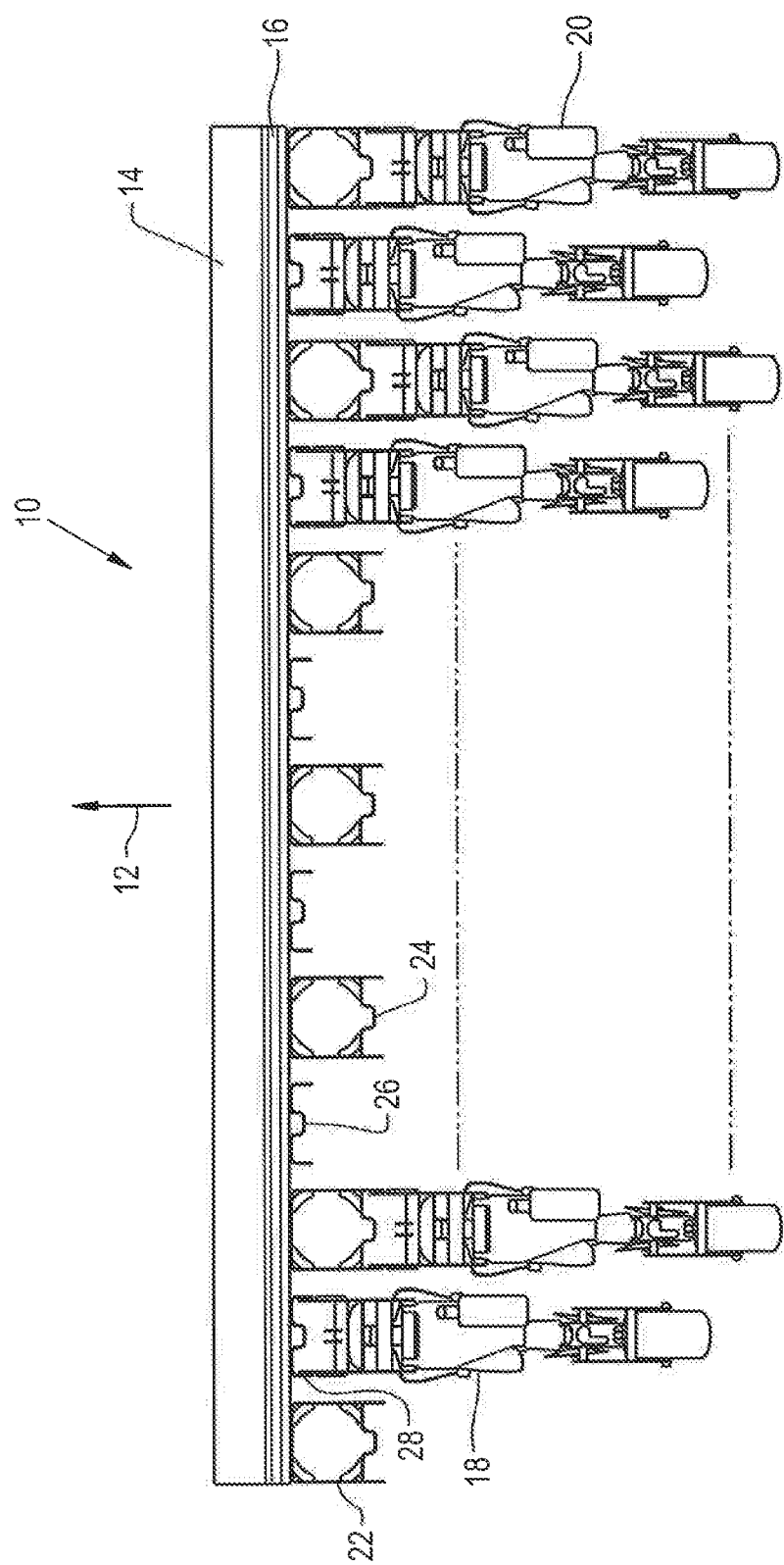
FIG. 1 is a top view of a portion of an agricultural planter incorporating the invention in one form.

Referring now to the drawings, and more particularly to FIG. 1, there is shown a portion of a planter 10 or similar agricultural implement which may be towed generally in the direction of arrow 12. The implement includes a tool bar 14 to which an elongated channel 16 of generally C-shaped cross-section is fixed as by welding along the closed edge of the "C". As noted earlier, many planting implements are too wide for transport on highways, entry to farm fields through gates, or for barn storage. These may have a relatively fixed central portion with additional portions extending laterally as wings which may be pivoted and/or rotated to a stowed position for transport or storage. The tool bar 14 illustrated may either form part of such a central portion or part of a wing.

A number of illustrative row units such as 18 and 20 are shown. The configuration illustrated would be for planting narrow spaced rows of crop, e.g., beans. The illustrated row units are conventional and are received in head brackets such as 22, 24 and 26 in a conventional manner. The current technology uses threaded U-Bolts to clamp around the main part of the tool bar 14 and attaches the head brackets like 22, 24 and 26 directly thereto with nuts. These head brackets are attached to the tool bar in an entirely different fashion in the present invention.

Figure 2:
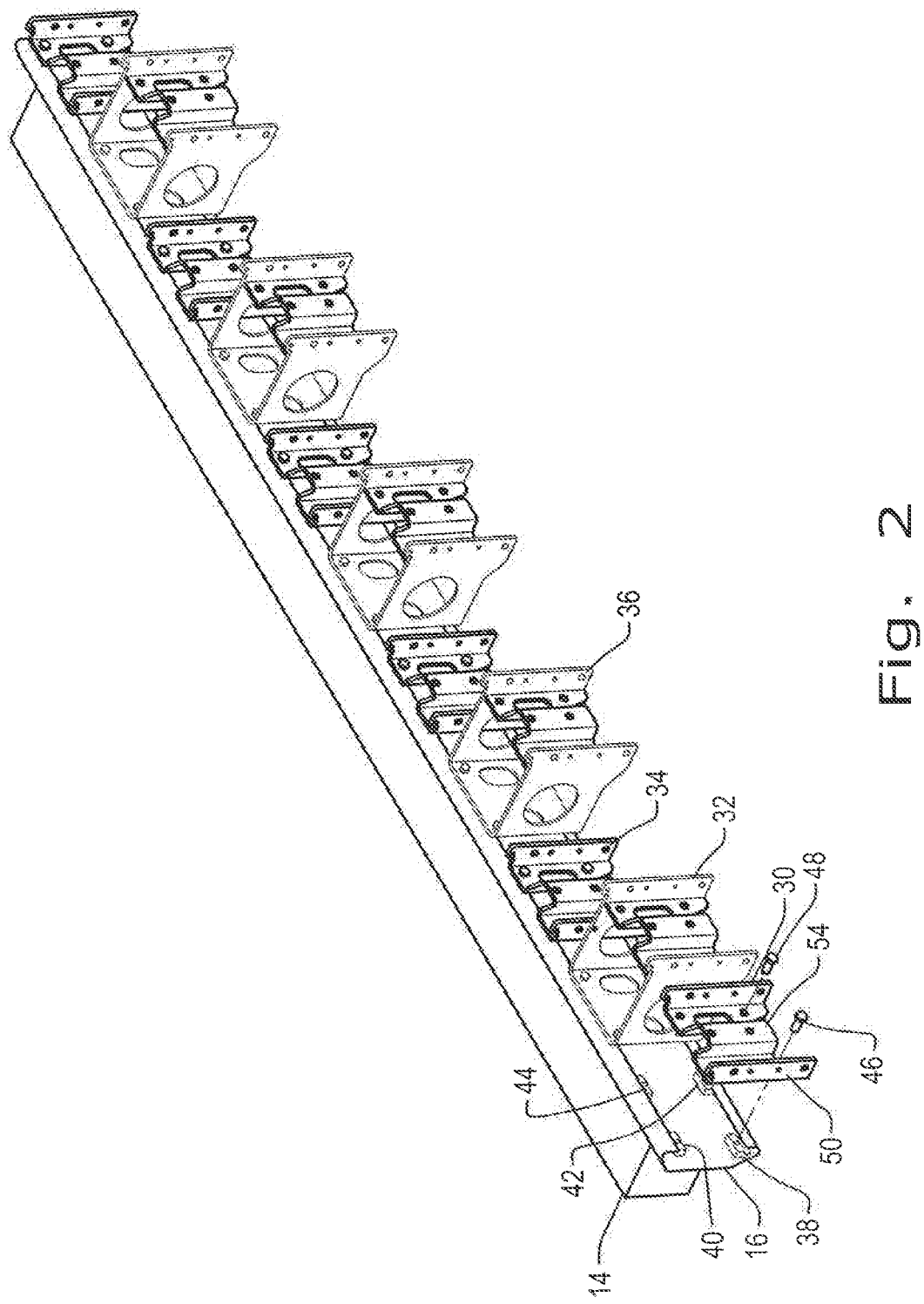
FIG. 2 is an isometric view of an illustrative tool bar, C-shaped channel and head brackets suitable for use in FIG. 1.
Figure 5:
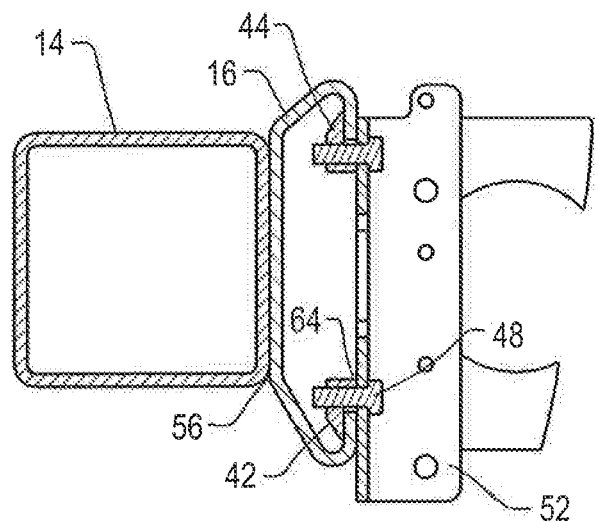
FIG. 5 is a cross-sectional view along line 5-5 of FIGS. 3 and 4.

In FIG. 2, an illustrative head bracket 30 is shown in spaced alignment with the elongated channel 16. The remaining head brackets such as 32, 34 and 36 are fixed to the channel. Brackets such as 32 and 36 differ from brackets such as 34 only in extending further rearward and employing an additional plate adjacent to the channel to accept bolts and clamping nuts. The channel 16 is fixed to the tool bar 14 by welding at 56 (FIG. 5) along the closed edge of the "C". A set of clamping nuts 38, 40, 42 and 44 are positioned within the open side of the "C" to receive corresponding bolts such as 46 and 48. Each bracket has a generally U-shaped cross-sectional configuration having a pair of row unit gripping arms 50 and 52 extending from an intermediate region 54. The intermediate region 54 includes a set of apertures certain ones of which may be generally aligned with corresponding edges of the open side of the "C".

Figure 6:
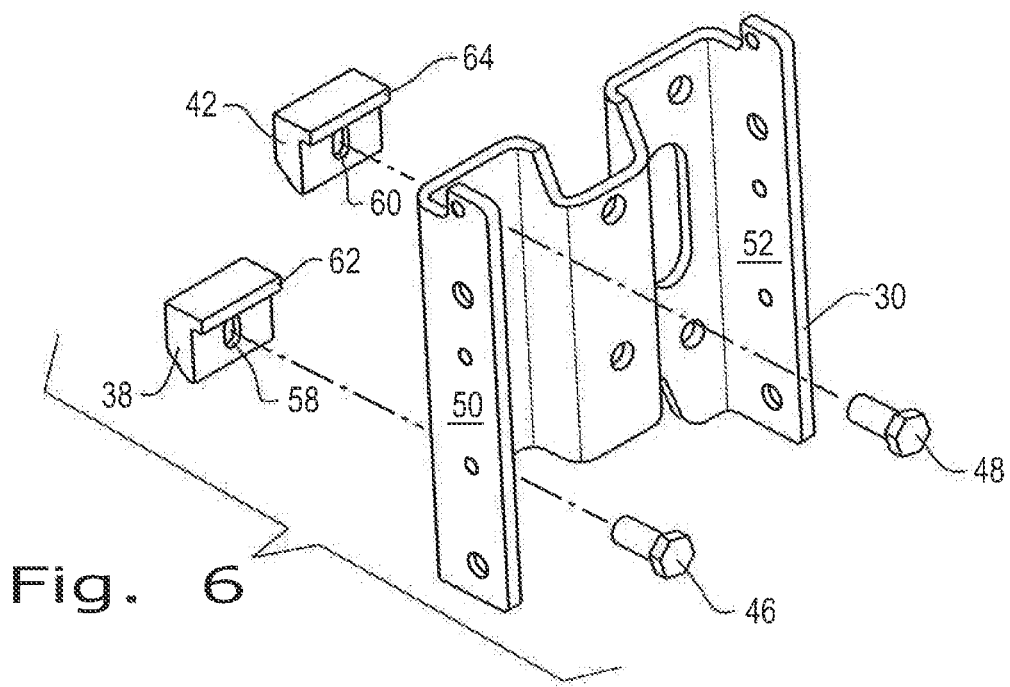
FIG. 6 is an exploded isometric view of an illustrative head bracket and clamping nuts for use in FIGS. 2-5.
Figure 7:
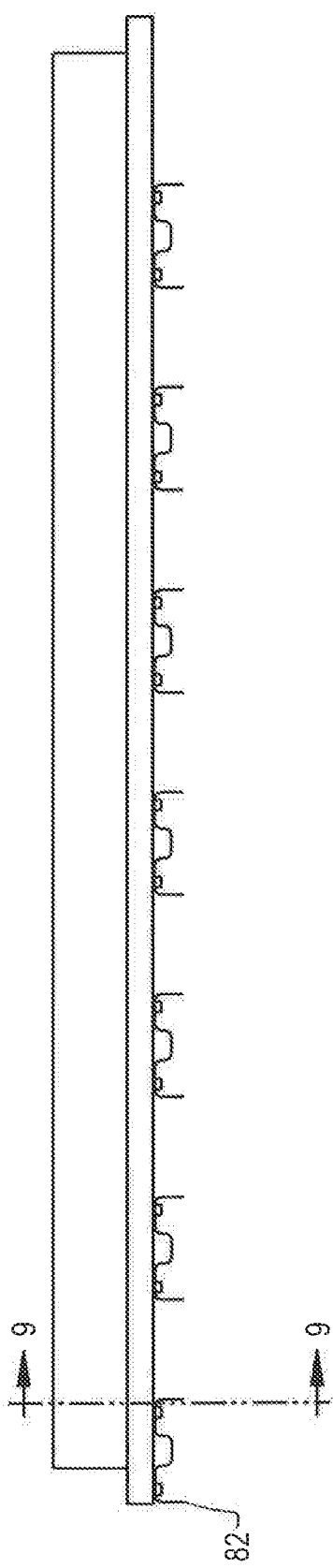
FIG. 7 is a top plan view of a variation on FIG. 3.
Figure 8:
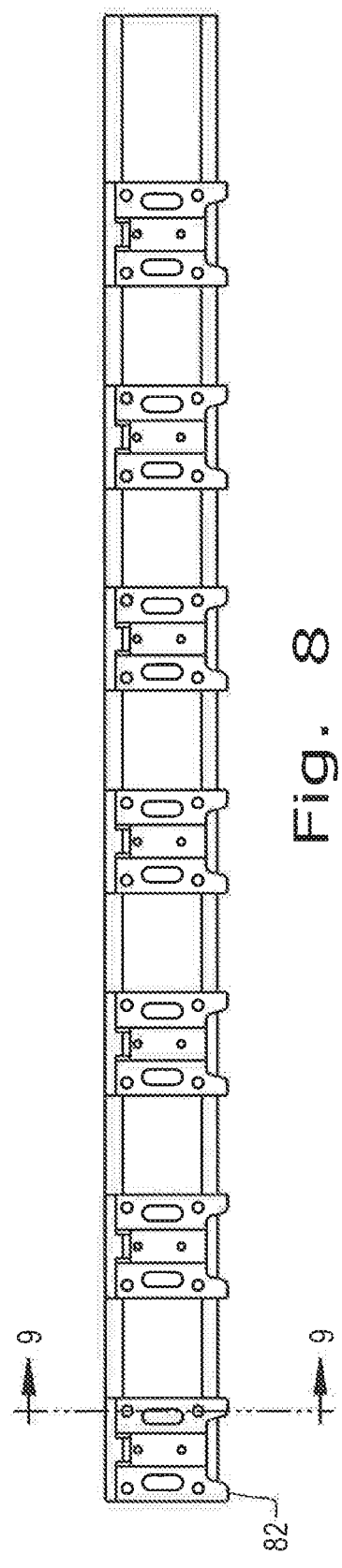
FIG. 8 is a rear elevation view of the structure of FIG. 7.
Figure 9:
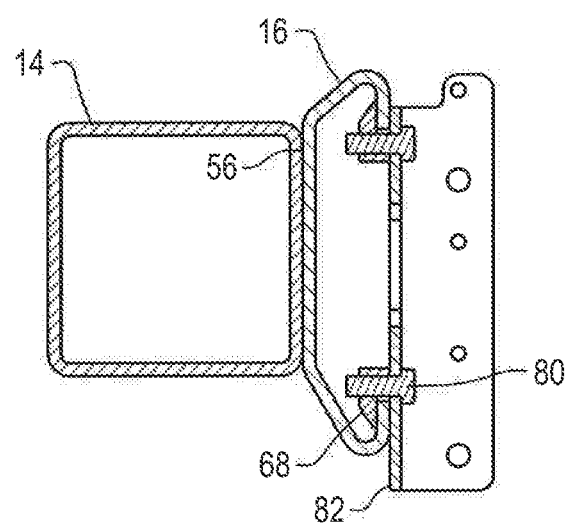
FIG. 9 is a cross-sectional view along line 9-9 of FIGS. 7 and 8.

There is a set of four clamping nut and bolt assemblies for each bracket. Each clamping nut may, as best seen in FIG. 6, comprise an elongated member of generally uniform cross-sectional configuration having a threaded aperture 58 or 60 near one edge and a laterally extending lip 62 or 64 whereby the nut may be positioned within the open "C" with the bolt passing through a bracket aperture to threadedly engage the nut with the lip gripping the inner edge of the "C" as the bolt is tightened. Any difficulty in locating the upper clamping nuts 40 and 44 within the "C" to threadedly receive the corresponding bolts may be avoided by first passing the upper bolts through the head bracket and loosely joining those bolts with the nuts 40 and 44. The clamping nuts may then be tipped into position behind the upper edge of the open "C" and the remaining bolts 46 and 48 then joined with their clamping nuts 38 and 42. An alternative is to employ the technique of FIG. 10.

The clamping brackets of FIGS. 2.5 are configured for a narrow row spacing while the clamping brackets of FIGS. 7-10 are configured for a wider row spacing as might be employed in planting corn. The clamping nuts 66 and 68 are again configured as elongated rigid members having a transverse threaded aperture and an elongated lip extending along one edge generally orthogonal to the threaded aperture. The lip is contoured to mate with a corresponding edge of the open side of the "C". Clamping nuts 66 and 68 are a good bit longer that nuts such as 40 and each includes a pair of transverse generally parallel spaced apart threaded apertures 70 and 72 or 74 and 76 so that each clamping nut may accommodate a pair of bolts such as 78 and 80.

An assembly technique utilizing these longer clamping nuts is illustrated in FIG. 10. Bolts such as 78 and 80 are passed through apertures in head bracket 82 and loosely threaded into the clamping nut apertures 70, 72, 74 and 76 as indicated by dotted lines 84. Then the assembly is slid longitudinally into the channel open end 86 along lines 88. The set of clamping nuts passes into the open "C" end and along the interior of the "C" edge until the bracket is positioned at a preferred location whereupon the bolts may be tightened to lock the bracket at that preferred location. The opposite channel end may be similarly open to accept head brackets with clamping nut and bolt assemblies.

Repositioning of head brackets simply requires loosening four bolts, sliding the bracket to a desired location, and retightening the four bolts.

Substantially the same advantages accrue when employing a set of single clamping nuts as in FIG. 6, or the double clamping nut as shown in FIG. 10 and either clamping nut configuration may be employed in any of the illustrated assemblies. By moving the attachment point off the tool bar and to a formed structural shape that is welded to the bar adjustment is made easier. This also makes it possible to communize tool bars in the plant so that the base tool bar is the same for equal sizes planters. This would also allow the size of the tool bar shape (7×7 today) to vary in size (say to an 8×8 or a 9×7) without the need to tool another bolt on head bracket.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A fastening arrangement for attaching a row unit to the tool bar of an agricultural implement, comprising:
    an elongated channel having a web operatively connected to the tool bar and a leg operatively connected to the web, the leg including a leading surface lying in a first plane nonadjacent to a second plane which includes a trailing surface of the tool bar;
    a head bracket adapted to receive a row unit, the head bracket having an aperture therethough and being supportable on the leg of the elongated channel; and
    a clamping nut and bolt combination configured to fasten the head bracket to the leg, the clamping nut and bolt combination including a bolt adapted to pass through the aperture of the head bracket and engage the clamping nut in a mating relationship.

2. The fastening arrangement of claim 1 wherein the leg is a first leg and wherein the elongated channel includes a second leg, the second leg having a leading surface lying in the first plane.

3. The fastening arrangement of claim 2 wherein the clamping nut and bolt combination is a first clamping nut and bolt combination and fastening arrangement further comprises a second clamping nut and bolt combination configured to fasten the head bracket to the second leg, the second clamping nut and bolt combination including a bolt adapted to pass through the second aperture of the head bracket and engage the clamping nut of the second clamping nut and bolt combination in a mating relationship.

4. The fastening arrangement of claim 2 wherein the first and second legs and the web are interconnected by corresponding flanges such that the elongated channel has a uniform C-shaped cross-sectional configuration, the web of the elongated channel being operatively connected to the trailing surface of the tool bar.

5. The fastening arrangement of claim 3 wherein the web of the elongated channel is permanently connected to the tool bar by welding.

6. The fastening arrangement of claim 1 wherein the clamping nut and bolt combination is one of a plurality of clamping nut and bolt combinations and wherein the aperture through the head bracket is one of a plurality of apertures, each of the plurality of clamping nut and bolt combinations including a bolt adapted to pass through a corresponding aperture through the head bracket so as engage a corresponding clamping nut in a mating relationship.

7. The fastening arrangement of claim 1 wherein the head bracket has a generally U-shaped cross-sectional configuration having a pair of row unit gripping arms extending from an intermediate region, the intermediate region including the aperture adapted to receive the bolt therethrough.

8. The fastening arrangement of claim 7 wherein:
the leg is a first leg and wherein the elongated channel includes a second leg having a leading surface lying in the first plane;
the aperture is a first aperture;
the intermediate region includes second, third and fourth apertures therethrough;
the clamping nut and bolt combination is a first clamping nut and bolt combination and fastening arrangement further comprises second, third and fourth clamping nut and bolt combinations;
the second clamping nut and bolt combination is configured to fasten the head bracket to the first leg, the second clamping nut and bolt combination including a bolt adapted to pass through the second aperture of the head bracket and engage the clamping nut of the second clamping nut and bolt combination in a mating relationship;
the third clamping nut and bolt combination is configured to fasten the head bracket to the second leg, the third clamping nut and bolt combination including a bolt adapted to pass through the third aperture of the head bracket and engage the clamping nut of the third clamping nut and bolt combination in a mating relationship; and
the fourth second clamping nut and bolt combination is configured to fasten the head bracket to the second leg, the fourth clamping nut and bolt combination including a bolt adapted to pass through the fourth aperture of the head bracket and engage the clamping nut of the fourth clamping nut and bolt combination in a mating relationship.

9. A fastening arrangement for attaching row units to the tool bar of an agricultural implement, comprising:
a plurality of head brackets, each head bracket including at least first and second apertures and being adapted to receive a row unit;
an elongated channel including:
a web operatively connected to the tool bar;
a first leg operatively connected to the web, the first leg having a leading surface lying in a first plane nonadjacent to a second plane which includes a trailing surface of the tool bar;
a second leg operatively connected to the web, the second leg having a leading surface lying in the first plane; and
first and second clamping nut and bolt combinations for fastening corresponding head brackets to the first and second legs;
wherein:
the first clamping nut and bolt combinations including a bolt adapted to pass through the first aperture in a corresponding head bracket and threadedly engage a clamping nut of the first clamping nut and bolt combination in a mating relationship to fasten the corresponding head bracket to the first leg; and
the second clamping nut and bolt combinations including a bolt adapted to pass through the second aperture in a corresponding head bracket and threadedly engage a clamping nut of the second clamping nut and bolt combination in a mating relationship to fasten the corresponding head bracket to the second leg.

10. The fastening arrangement of claim 9 wherein the first and second legs and the web interconnected by corresponding first and second flanges such that the elongated channel has a uniform C-shaped cross-sectional configuration, the web of the elongated channel being operatively connected to the trailing surface of the tool bar.

11. The fastening arrangement of claim 10 wherein the web of the elongated channel member is permanently connected to the tool bar by welding.

12. The fastening arrangement of claim 9 wherein each of the plurality of head brackets has a generally U-shaped cross-sectional configuration having a pair of row unit gripping arms extending from an intermediate region, the intermediate region including the first and second apertures adapted to receive the bolt therethrough.

13. A towable agricultural implement, comprising:
a transverse tool bar having a leading face and a trailing face;
a row unit; and
a coupling arrangement for coupling the row unit to the tool bar, the coupling arrangement including:
an elongated channel having a web operatively connected to the tool bar and a leg, the leg having a leading surface lying in a first plane nonadjacent to a second plane which includes the trailing face of the tool bar;
a head bracket adapted to receive the row unit, the head bracket having an aperture therethough and being supportable on the leg; and
a clamping nut and bolt combination configured to fasten the head bracket to the elongated flat plate, the clamping nut and bolt combination including a bolt adapted to pass through the aperture of the head bracket engage the clamping nut in a mating relationship.

14. The towable agricultural implement of claim 13 wherein the leg is a first leg and further comprising a second leg having a leading surface lying in the first plane.

15. The towable agricultural implement of claim 14 wherein the first and second legs and the web are interconnected by corresponding flanges such that the elongated channel has a uniform C-shaped cross-sectional configuration, the web of the elongated channel being operatively connected to the trailing surface of the tool bar.

16. The towable agricultural implement of claim 15 wherein the web of the elongated channel member is permanently connected to the tool bar by welding.

17. The towable agricultural implement of claim 13 wherein the clamping nut and bolt combination is one of a plurality of clamping nut and bolt combinations and wherein the aperture through the head bracket is one of a plurality of apertures, each of the plurality of clamping nut and bolt combinations including a bolt adapted to pass through a corresponding aperture through the head bracket so as engage a corresponding clamping nut in a mating relationship.

18. The towable agricultural implement of claim 13 wherein the head bracket has a generally U-shaped cross-sectional configuration having a pair of row unit gripping arms extending from an intermediate region, the intermediate region including the aperture adapted to receive the bolt therethrough.

* * * * *